United States Patent
Shih et al.

(10) Patent No.: US 8,982,085 B2
(45) Date of Patent: Mar. 17, 2015

(54) TOUCH PANEL (71) Applicant: Tianjin Funayuanchuang Technology Co., Ltd., Tianjin (CN)

(72) Inventors: Po-Sheng Shih, New Taipei (TW); Chih-Han Chao, New Taipei (TW); Chih-Chieh Chang, New Taipei (TW); Jia-Shyong Cheng, New Taipei (TW)

(73) Assignee: Tianjin Funayuanchuang Technology Co., Ltd., Tianjin (CN)

( * ) Notice: Subject to any disclaimer, the term of this patent is extended or adjusted under 35 U.S.C. 154(b) by 0 days.

(21) Appl. No.: 14/043,949

(22) Filed: Oct. 2, 2013

(65) Prior Publication Data
US 2014/0354902 A1 Dec. 4, 2014

(30) Foreign Application Priority Data
Jun. 3, 2013 (CN) .......................... 2013 1 0216516

(51) Int. Cl.
*G06F 3/041* (2006.01)
*B82Y 99/00* (2011.01)
(52) U.S. Cl.
CPC ............. *G06F 3/041* (2013.01); *Y10S 977/952* (2013.01); *B82Y 99/00* (2013.01)
USPC ........................... 345/173; 345/175; 977/952

(58) Field of Classification Search
USPC ............ 345/156, 173–175; 178/18.01–18.07, 178/19.01–19.05
See application file for complete search history.

(56) References Cited

U.S. PATENT DOCUMENTS

| 2008/0236905 A1* | 10/2008 | Endo et al. ................. 178/18.03 |
| 2010/0311494 A1* | 12/2010 | Miller et al. .................... 463/22 |
| 2014/0337621 A1* | 11/2014 | Nakhimov .................... 713/168 |

* cited by examiner

*Primary Examiner* — Ricardo L Osorio
(74) *Attorney, Agent, or Firm* — Novak Druce Connolly Bove + Quigg LLP (57) ABSTRACT

A touch panel includes an insulated substrate including a planar part and a folded part extending from the planar part; a transparent conductive layer located on the planar part and the folded part; a plurality of planar electrodes located on the planar part and electrically connected to the transparent conductive layer; and at least one side electrode located on the folded part and electrically connected to the transparent conductive layer on the folded part. The planar electrodes, the transparent conductive layer and the planar part are formed into a planar touch module configured to detect a planar input signal resulted from the planar part. The at least one side electrode the folded part and the transparent conductive layer on the folded part are formed into a side touch module configured to sense a side input signal resulted from at least one virtual key corresponding the at least one side electrode.

20 Claims, 5 Drawing Sheets

TOUCH PANEL

RELATED APPLICATIONS

This application claims all benefits accruing under 35 U.S.C. §119 from China Patent Application No. 201310214651.6, filed on Jun. 3, 2013 in the China Intellectual Property Office, the disclosure of which is incorporated herein by reference.

BACKGROUND

1. Technical Field

The present disclosure relates to touch panels, particularly to a touch panel based on carbon nanotubes.

2. Discussion of Related Art

Various electronic devices such as mobile phones, car navigation systems, and the like are equipped with optically transparent touch panels applied over display devices such as liquid crystal panels. The electronic apparatus is operated when contact is made with the touch panel corresponding to elements appearing on the display device. A demand thus exists for such touch panels to maximize visibility and reliability in operation. Resistive and capacitive type touch panels are widely applied because of the higher accuracy and low cost of production.

The traditional touch panels have only one touch work surface. However, when the touch panels are applied in cell phones, flat plane display devices, and other electronic devices, they usually need additional keys on their sides to control volume or their switches. Therefore, a single traditional touch panel cannot perform sensing touch signals resulted from its different surfaces.

What is needed, therefore, is to provide a touch panel, to overcome the above-described shortcomings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings. It should be noted that references to "an" or "one" embodiment in this disclosure are not necessarily to the same embodiment, and such references mean at least one.

A touch panel is provided. The touch panel includes an insulated substrate, a transparent conductive layer, a plurality of planar electrodes and at least one side electrode. The insulated substrate includes a planar part and a folded part formed by extending from the planar part. The transparent conductive layer is located on the planar part and the folded part. The planar electrodes are located on edges of the planar part of the insulated substrate and electrically connected to the transparent conductive layer, to form a planar touch module. The planar touch module is configured to sense planar input signals resulted from touching the planar part.

The at least one side electrode is located on the folded part of the insulated substrate, and electrically connected to the transparent conductive layer located on the folded part, to form a side touch module. The at least one side electrode corresponds to at least one virtual key. Each virtual key can act the same function as the physical key, such as, a switch key and a volume key of an electronic device using the touch panel. The side touch module is configured to sense side input signals resulted from touching the at least one virtual key. Therefore, the touch panel includes two touch modules, which can perform sensing the input signals resulted from the planar part and the folded part of the insulated substrate. The touch panel can sense the signals resulted from different surfaces.

The insulted substrate is mainly to support the transparent conductive layer. The planar part of the insulated substrate is mainly used to support the planar touch module. The folded part of the insulated substrate is mainly used to support the side touch module. An angle is defined by the folded part and the planar part. The angle is larger than or equal to −180 degrees, and less than 0 degrees; or larger than 0 degrees, and less than or equal to 180 degrees (the angle defined by clockwise folding the planar part is positive). Namely, the angle is larger than or equal to −180 degrees, and less than or equal to 180 degrees, but is not equal to 0 degrees. The angle can be −150 degrees, −120 degrees, −90 degrees, −45 degrees, 30 degrees, 45 degrees, 60 degrees, 120 degrees or 180 degrees. The folded part is formed at periphery of the planar part. A material of the insulated substrate can be hard or flexible. In one embodiment, the insulated substrate is a flexible film or board, the material of the insulated substrate is a flexible material. The flexible material can be polycarbonate (PC), polymethyl methacrylate acrylic (PMMA), polyethylene terephthalate (PET), polyether polysulfones (PES), polyvinyl polychloride (PVC), benzocyclobutenes (BCB), polyesters or acrylic resins. Materials of the substrate are not limited to the above described.

The transparent conductive layer is an integrated sheet-shaped structure, and includes a planar conductive part and a side conductive part. The planar conductive part is located on the planar part of the insulated substrate and defines a planar touch region on the planar part. The side conductive part is located on the folded part of the insulated substrate. The at least one side electrode is located on and electrically connected to the side conductive part. The side conductive part and the at least one side electrode define a side touch region on the folded part of the insulated substrate. Side touch positions of the side touch region are fixed, and correspond to the virtual keys in a one-by-one manner. The virtual keys are defined in the side touch region. If the virtual keys are touched, the side touch module can display the corresponding functions.

The transparent conductive layer is transparent, electrically conductive and flexible. The material of the transparent conductive layer can be carbon nanotube, electrical polymer, such as poly(3,4-ethylenedioxythiophene) (PEDOT). In one embodiment, the transparent conductive layer consists of carbon nanotubes, and the transparent conductive layer is a carbon nanotube layer including a plurality of carbon nanotubes arranged orderly or disorderly. When the carbon nanotubes are arranged disorderly, the carbon nanotubes are entangled with each other or arranged isotropically. When the carbon nanotubes in the carbon nanotube layer are arranged orderly, the carbon nanotubes are arranged along one or more preferred orientations. The carbon nanotubes in the carbon nanotube layer define a plurality of micropores between adjacent carbon nanotubes.

The carbon nanotube layer can include at least one carbon nanotube film. In one embodiment, the carbon nanotube layer includes a plurality of carbon nanotube films substantially stacked with each other or located side by side. The carbon nanotube film can be a drawn carbon nanotube film, a pressed carbon nanotube film, or a flocculated carbon nanotube film.

Figure 1:
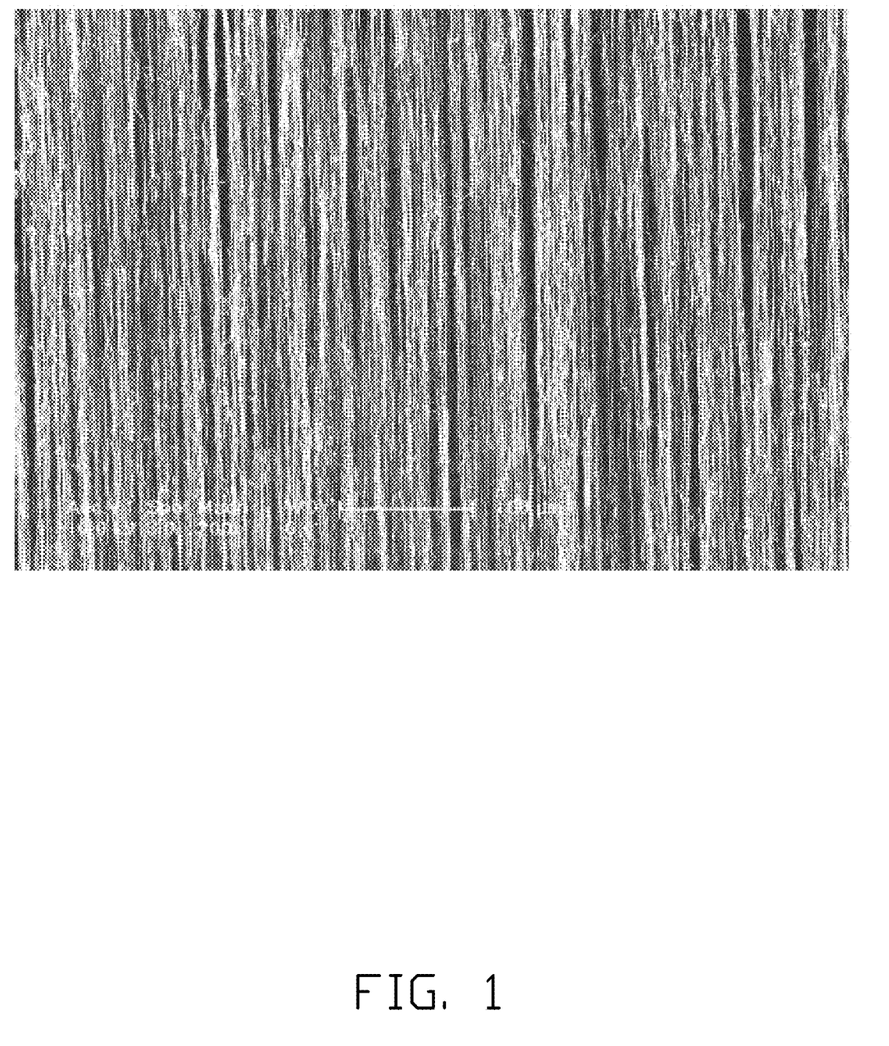
FIG. 1 shows a scanning electron microscope (SEM) image of a carbon nanotube film applied in one embodiment of a touch panel.

In one embodiment, the carbon nanotube layer used as the transparent conductive layer is a drawn carbon nanotube film. Referring to FIG. 1, the drawn carbon nanotube film includes a plurality of carbon nanotubes substantially oriented along a same preferred orientation and approximately parallel to each other. The extending directions of the carbon nanotubes are substantially parallel to the surface of the carbon nanotube film. The carbon nanotubes are joined end-to-end by van der Waals attractive force therebetween.

The carbon nanotube film is a free-standing structure. The term "free-standing structure" includes, but is not limited to, a structure capable of being supported by itself and does not need a substrate to lie on. For example, the carbon nanotube film can be lifted by one point thereof such as a corner without sustaining damage under its own weight. In this connection, the term "approximately" or "substantially" as used herein means that it is impossible and unnecessary that each of the carbon nanotubes in the carbon nanotube films be exactly parallel to one another, because in the course of fabricating the carbon nanotube film, some factor such as the change of drawing speed and non-uniform drawing force on the carbon nanotube film when the carbon nanotube film is drawn from a carbon nanotube array affects the orientations of the carbon nanotubes.

A film can be drawn from a carbon nanotube array to form the ordered carbon nanotube film. The drawn carbon nanotube film is an electrically anisotropic film. The resistant conductivity of the drawn carbon nanotube film along the extending directions of the carbon nanotubes can be less than the resistant conductivities of the drawn carbon nanotube film along other directions. Examples of drawn carbon nanotube film are taught by U.S. Pat. No. 7,045,108 to Jiang et al. The drawn carbon nanotube film includes a plurality of successive and oriented carbon nanotubes joined end-to-end by van der Waals attractive force therebetween. The drawn carbon nanotube film is a free-standing film. The drawn carbon nanotube film can be treated with an organic solvent to increase the mechanical strength and toughness of the carbon nanotube film and reduce the coefficient of friction of the drawn carbon nanotube film. A thickness of the drawn carbon nanotube film can be about 0.5 nanometers (nm) to about 100 micrometers (μm). In one embodiment, the thickness of the drawn carbon nanotube film is about 100 nm to about 200 nm.

A method of making a drawn carbon nanotube film includes providing an array of carbon nanotubes and pulling out a drawn carbon nanotube film from the array of carbon nanotubes. Pulling can be aided by the use of a tool such as adhesive tape, pliers, tweezers, or other tools allowing multiple carbon nanotubes to be gripped and pulled simultaneously. The drawn carbon nanotube film can be formed by selecting one or more carbon nanotubes having a predetermined width from the array of carbon nanotubes and pulling the carbon nanotubes at a substantially uniform speed to form carbon nanotube segments that are joined end to end to achieve a uniform drawn carbon nanotube film.

The carbon nanotube segments can be selected by using the tool allowing multiple carbon nanotubes to be gripped and pulled simultaneously to contact the array of carbon nanotubes. The pulling direction can be substantially perpendicular to the growing direction of the array of carbon nanotubes.

During the pulling process, as the initial carbon nanotube segments are drawn out, other carbon nanotube segments are also drawn out end to end due to van der Waals attractive force between ends of adjacent segments. This process of pulling produces a substantially continuous and uniform carbon nanotube film having a predetermined width.

The drawn carbon nanotube film is flexible and can be folded into any shape, because the carbon nanotubes are flexible. The drawn carbon nanotube film is also transparent and electrically conductive. A transparency of the single drawn carbon nanotube film can be greater than 85% during visible light region. If the carbon nanotube layer includes a plurality of drawn carbon nanotube films, the drawn carbon nanotube films can be overlapped with each other or located side by side without space, and the carbon nanotubes in the drawn carbon nanotube films extend substantially along a same direction. The layers of the drawn carbon nanotube film in the carbon nanotube layer are not limited, as long as the carbon nanotube layer can be transparent.

The planar electrodes are electrically insulated with the at least one side electrode. The planar electrodes are located on a surface of the transparent conductive layer and at periphery of the planar touch region. The planar electrodes are spaced from each other. All of the planar electrodes can be located on the planar conductive part. The planar electrodes can be located on the same side of the planar conductive part, or on two opposite sides of the planar conductive part. In addition, the planar electrodes can be partly located on the planar conductive part, and be partly located on the side conductive part.

The planar touch module can further include a plurality of planar lead wires electrically connected to the planar electrodes one-by-one. A first end of each planar lead wire is electrically connected to one of the planar electrodes. A second end of each planar lead wire is electrically connected to an external circuit, such as circuit board. The second end is opposite to the first end. The planar lead wires are spaced from each other. The second ends of the planar lead wires are converged at a same side of the transparent conductive layer to connect with the external circuit. At least part of the planar lead wires is located on the folded part of the insulated substrate. In one embodiment, a part of each planar lead wire is located on the planar part of the insulated substrate, and the other part of each lead wire is located on the side part of the insulated substrate. The specific structure of the planar touch module is related to the signals input into the planar touch module. The planar input signals of the planar touch module can be single-touch input signals, multi-touch input signals, or hand figure input signals. The planar touch module can be a capacitance touch panel or a resistance touch panel.

The side touch module further includes at least one side lead wire electrically connected to the at least one side electrode in a one-by-one manner. The at least one side lead wire and the planar lead wires are converged at the same side of the transparent conductive layer to connect with the external circuit. In one embodiment, the side touch module includes a plurality of side electrodes spaced from each other and a plurality of side lead wires spaced from each other. The side electrodes are electrically insulated from each other and located on the folded part of the insulated substrate. At least part of the side lead wires is located on the folded part of the insulated substrate. The side lead wires are electrically insulated from each other. The side touch module has independent circuit route lines. The virtual keys in the side touch module are fixed. Once the virtual keys are touched, their corresponding side electrodes and side lead wires will collaborate to execute commands from the virtual keys. As such, the electronic device using the touch panel can perform the functions of the virtual keys resulted by pressing the virtual keys, and further can sense the side input signals resulted from the virtual keys of the side touch module. The functions of the virtual keys are substantially equivalent to those of the physical keys. In addition, the transparent conductive layer is transparent, when a fluorescent material is located below the side module, if the virtual keys are touched, the fluorescent material will emit light. Thus, the virtual keys will act as luminescent physical keys.

The arrangements and the number of the planar electrodes, the transparent conductive layer, the planar lead wires, the at least one side electrode, and at least one side lead wire are related to the types of the touch panel. The number of the insulated substrate, the transparent conductive layer, the side electrode, and the side lead wire are not limited to one, but can be two or more. The number of the side electrode and the side lead wire can be four or more. The folded part of the insulated substrate is also not limited to one, but can be two, three or four. Thus, in the touch panel, the side touch module is also not limited to one.

Therefore, in the touch panel, the insulated substrate can include a single planar part and at least one folded part; the transparent conductive layer can include a single planar conductive part and at least one side conductive part. The planar electrodes are all located on and electrically connected to the planar conductive part, to form a single planar touch module configured to sense input signals resulted from pressing the planar touch module. The at least one side electrode and the at least one side conductive layer can form at least one side touch module. The at least one side electrode corresponds to at least one virtual key.

The planar touch module is in use, the planar touch region is touched, the touch location can be sensed by alternatively scanning, the planar touch module will perform the command sent from the planar touch location. When the side touch module is used, because the virtual key corresponding to the side electrode, a capacitance or a current of the side conductive part connected to the side electrode will be changed after the virtual key is pressed. The side electrode is electrically connected to the external circuit. The side touch location will be detected according to the change of the capacitance or the current resulted from the side conductive part, without using additional circuits to alternatively scan the side electrodes. The command sent from the side touch location will be executed by the side touch module. In one embodiment, if the side touch location corresponding to the side electrode is used to control volume, if the virtual key is touched, the volume of the electronic device using the touch panel will be controlled without using additional circuits to apply on the side electrodes. Therefore, the structure of the side touch module is simple. The touch panel even has a simple structure, it also can detect input signals from two different surfaces.

Materials of the planar electrodes, the planar lead wires, the at least one side electrode, and the at least one side lead wire can be carbon nanotube, conductive silver paste, nanoscaled silver, electrically conductive polymer, or other flexible conductive material, as long as the material is an electrically conductive material and flexible. The electrically conductivity of the planar electrodes, the planar lead wires, the at least one side electrode, or the at least one side lead wire almost cannot be affected by the folding of the planar electrodes, the planar lead wires, the at least one side electrode, or the at least one side lead wire, or only slightly affected. The planar electrodes and the at least one side electrode are formed on a surface of the insulated substrate by printing methods, coating methods or laying methods. In addition, the planar lead wires and the at least one lead wire also can be tiny thin metal wires.

Other function layers can also be inserted in the touch panel, such as a protective layer, a shield layer.

Figure 2:
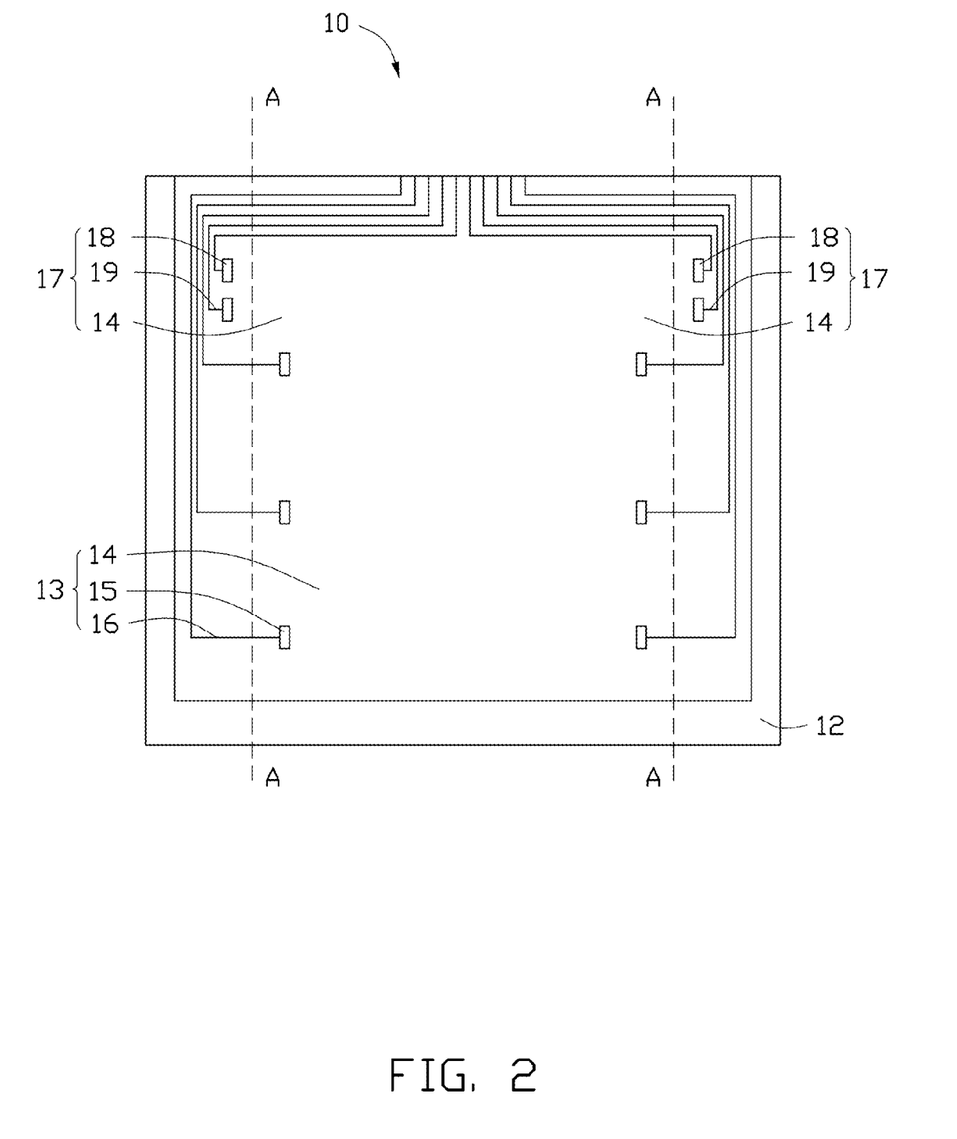
FIG. 2 is an unfolded, plan schematic view of one embodiment of a touch panel.
Figure 3:
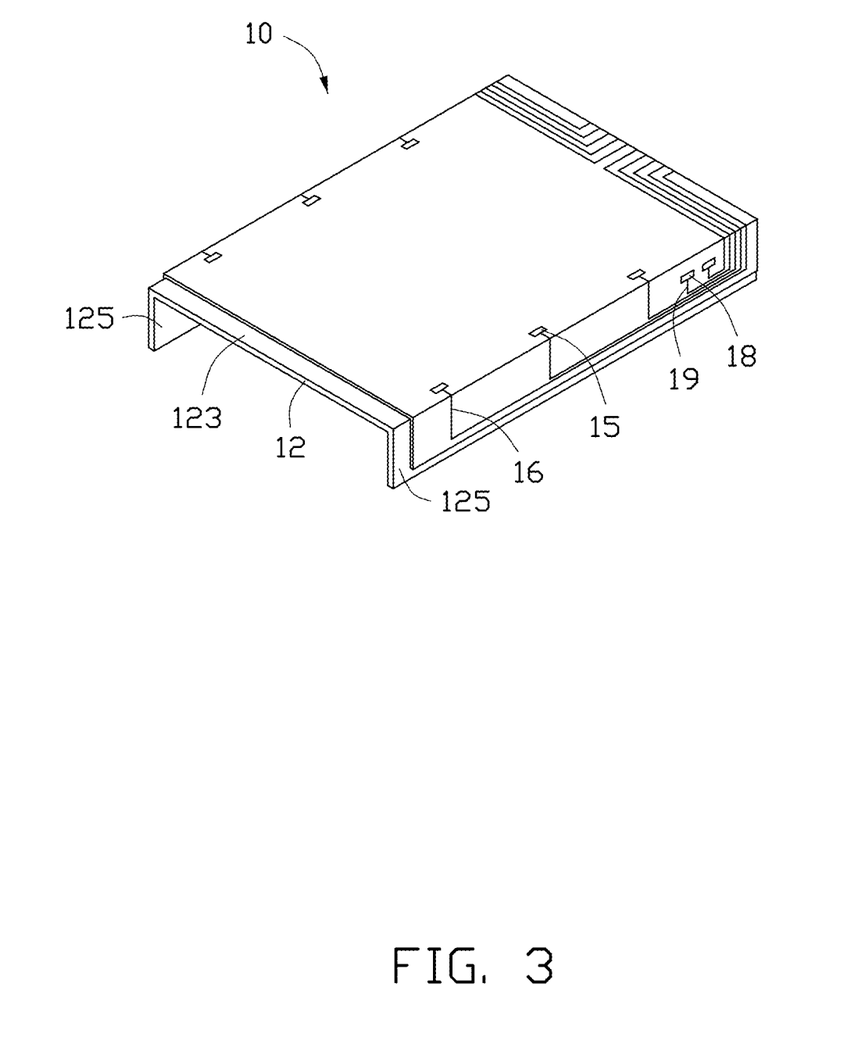
FIG. 3 is an isometric view of the touch panel, which is folded along folded lines A-A show in FIG. 2.

Referring to FIGS. 2 and 3, one embodiment of a capacitance-type touch panel 10 capable of multi-touch function is provided. The touch panel 10 includes a single insulated substrate 12, a transparent conductive layer 14, a plurality of planar electrodes 15, a plurality of planar lead wires 16, a plurality of spaced side electrodes 18, and a plurality of spaced side lead wires 19. The transparent conductive layer 14 is placed on a surface of the insulated substrate 12. The planar electrodes 15 are spaced from each other and located on two opposite side of the transparent conductive layer 14 in a one-by-one manner. The planar electrodes 15 are electrically connected to the planar lead wires 16 in a one-by-one manner. The planar lead wires 16 are spaced and electrically insulated from each other. The transparent conductive layer 14, the planar electrodes 15 and the planar lead wires 16 are formed into a planar touch module 13. The planar touch module 13 is used to sense signals resulted from touching the planar touch module 13.

The transparent conductive layer 14, the side electrodes 18 and the side lead wires 19 are formed into two side touch modules 17. The side electrodes 18 correspond to a plurality of virtual keys in a one-by-one manner. The two side touch modules 17 are used to sense input signals resulted from the virtual keys. The planar lead wires 16 and the side lead wires 19 are converged into a same side of the insulated substrate 12, and electrically connected to a same external circuit (not shown).

In one embodiment, the insulated substrate 12 consists of a planar part 123 and two opposite folded parts 125. The two folded parts 125 extend from the planar part 123 along a direction substantially parallel to a first direction, and are folded along two folded lines A-A. Angles defined by the planar part 123 and the two folded parts 125 are about 90 degrees. The planar part 123 is located in the center of the surface 121 of the insulated substrate 12. The insulated substrate 12 is folded into the two folded parts 125 along a direction substantially perpendicular to the first direction. The transparent conductive layer 14 includes a planar conductive part and two opposite side conductive parts. The planar conductive part is located on the planar part 123, and defines a planar touch region. The two side conductive parts are respectively located on the two folded parts 125.

The transparent conductive layer 14 is a single drawn carbon nanotube film, the carbon nanotubes in the transparent conductive layer 14 are substantially joined end-to-end along the first direction. The planar electrodes 15 are arranged on the planar conductive layer and near the folded lines A-A. Most part of each planar lead wire 16 is located on the folded parts 125, and a small part of each planar lead wire 16 is located on the planar part 123. The side electrodes 18 are respectively located on the two side conductive layers of the transparent conductive layer 14. The side lead wires 19 and the side electrodes 18 are electrically connected in a one-by-one manner. The two side conductive layers, the side electrodes 18 and the side lead wires 19 are formed into the two side touch modules 17. The virtual keys of the two side touch modules 17 are respectively acted as switch, controlling volume. It can be noted that all of the planar electrodes 15 also can be located at the same side of the planar conductive part.

In the present embodiment, the insulated substrate 12 is made of PC. The planar electrodes 15, the planar lead wires 16, four side electrodes 18 and four side lead wires 19 are formed by printing silver paste on the surface 121 of the insulated substrate 12.

Figure 4:
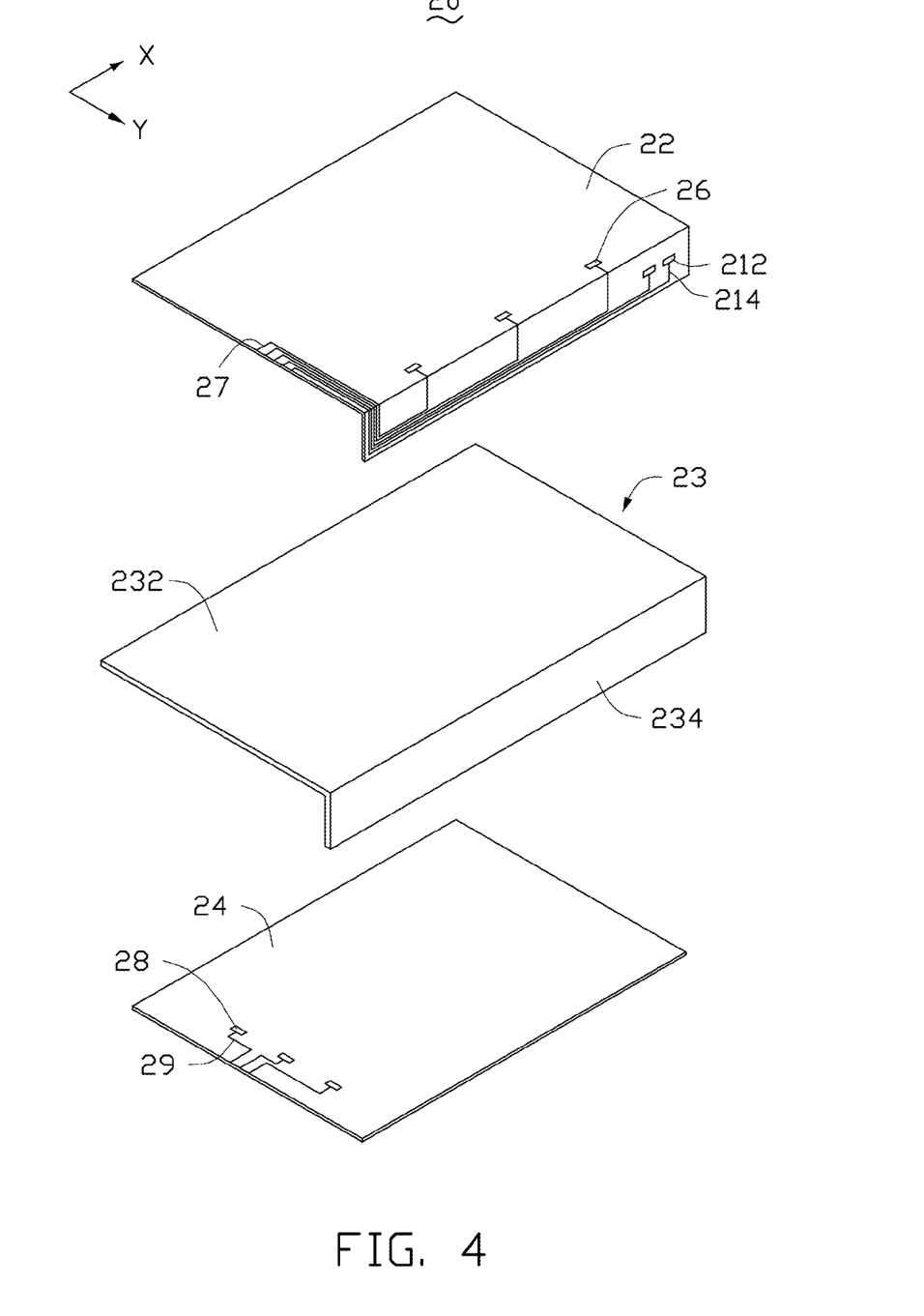
FIG. 4 is an exploded, isometric view of one embodiment of a touch panel.
Figure 5:
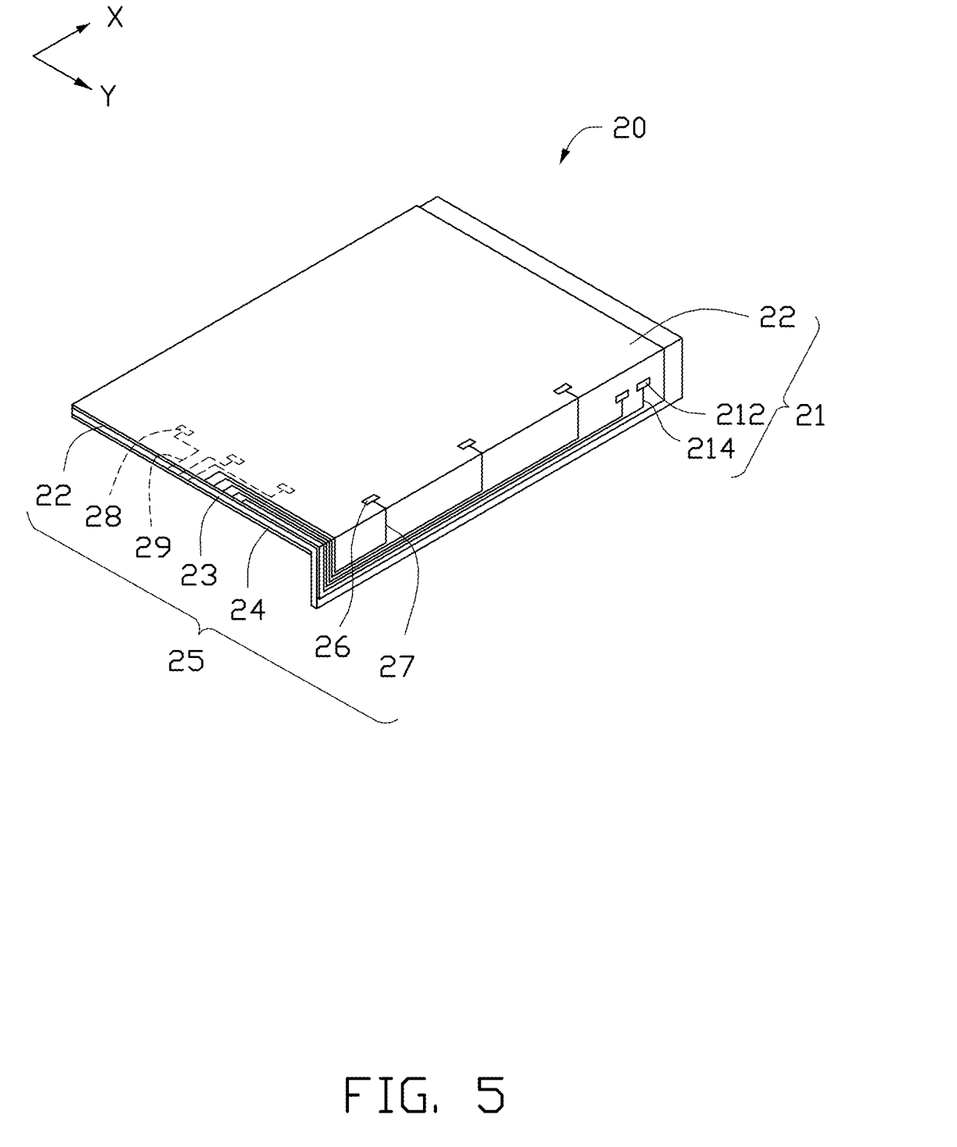
FIG. 5 is an assembled, isometric view of the touch panel show in FIG. 4.

Referring to FIGS. 4 and 5, one embodiment of a touch panel 20 is provided. The touch panel 20 includes a plurality of side electrodes 212, a plurality of side lead wires 214, a first transparent conductive layer 22, an insulated substrate 23, a second transparent conductive layer 24, a plurality of first planar electrodes 26, a plurality of first planar lead wires 27, a plurality of second planar electrodes 28 and a plurality of second planar lead wires 29. The first transparent conductive layer 22, the insulated substrate 23 and the second transparent conductive layer 24 are stacked in order.

The first planar electrodes 26 are arranged at the same side of the first transparent conductive layer 22 along an X direction. The first planar electrodes 26 are spaced from each other and electrically connected to the first transparent conductive layer 22. The first planar electrodes 26 are electrically connected to an external circuit (not shown) through the first planar lead wires 27. The second planar electrodes 28 are arranged at the same side of the second transparent conductive layer 24 along a Y direction substantially perpendicular to the X direction. The second planar electrodes 28 are spaced from each other and electrically connected to the second transparent conductive layer 24. The second planar electrodes 28 are electrically connected to the external circuit through the second planar lead wires 29. Thus, the first transparent conductive layer 22, the insulated substrate 23, the second transparent conductive layer 24, the first planar electrodes 26, the first planar lead wires 27, the second planar electrodes 28 and the second planar lead wires 29 are formed into a planar touch module 25.

The insulated substrate 23 consists of a planar part 232 and a folded part 234 extending from the planar part 232. The folded part 234 is located at one side of the planar part 232 substantially parallel to the X direction. The first planar electrodes 26, the second planar electrodes 28 and the second planar lead wires 29 are located on the planar part 232. Each first planar lead wire 27 is partly located on the folded part 234, and partly located on the planar part 232. The insulated substrate 23 is flexible, and made of PC.

The first transparent conductive layer 22 includes a first planar conductive part and a first side conductive part. The first planar conductive part covers a surface of the planar part 232. The first side conductive part covers a surface of the folded part 234. The second transparent conductive layer 24 is completely located on another surface of the planar part 232 and opposite to the first planar conductive part. The first planar conductive part is stacked with the second transparent conductive layer 24 to define a planar touch region. The planar touch module 25 is used to sense the signals produced at the planar part 232.

The first transparent conductive layer 22 is a single drawn carbon nanotube film including a plurality of carbon nanotubes substantially arranged along a same direction. The carbon nanotubes in the first transparent conductive layer 22 substantially extend along the Y direction and are joined end-to-end along the Y direction. The resistant conductivity of the first transparent conductive layer 22 along the Y direction is smaller than the resistant conductivities of the first transparent conductive layer 22 along other directions. The X direction is substantially parallel to the surface of the first transparent conductive layer 22 and perpendicular to the Y direction. The resistant conductivity of the first transparent conductive layer along the Y direction is the smaller than the resistant conductivities of the first transparent conductive layer along the X directions.

The first transparent conductive layer 22 can be considered as a plurality of spaced first conductive strips. The first transparent conductive layer 22 can have excellent electrical conductivity along the Y direction, and the first planar electrodes 26 are spaced from each other along the X direction. Each first conductive strip extends along the Y direction. The first conductive strips are electrically connected to the first planar electrodes 26 one by one. The first planar electrodes 26 are formed by printing silver paste on the first transparent conductive layer 22. The first transparent conductive layer 22 can also be a carbon nanotube film treated with an etching or laser method. The carbon nanotube film is treated with the laser method to form a plurality of laser cutting lines on the surface of the carbon nanotube film. Thus, the anisotropic property of the carbon nanotube film is improved. The first transparent conductive layer 22 is an anisotropic and electrical conductive layer.

The material of the second transparent conductive layer 24 can be the same as that of the first transparent conductive layer 22. The second transparent conductive layer 24 is a single drawn carbon nanotube film including a plurality of carbon nanotubes substantially oriented along a same direction. The carbon nanotubes of the second transparent conductive layer 24 substantially extend along the X direction, and joined end-to-to by van der Waals force on the X direction. The second transparent conductive layer 24 also can be considered as a plurality of spaced second conductive strips extending along the X direction. The second planar electrodes 28 are spaced from each other along the Y direction and located on a same side of the second transparent conductive layer 24. The second planar electrodes 28 are electrically connected to the second conductive strips one by one. Materials of the second planar electrodes 28 are the same as those of the first planar electrodes 26. The second planar electrodes 28 are located on the surface of the second transparent conductive layer 24.

The first planar electrodes 26 can also be located on two opposite sides of the first transparent conductive layer 22. The second planar electrodes 28 can also be located on two opposite sides of the second transparent conductive layer 24. In addition, the numbers of the first planar electrode 26 and the second planar electrodes 28 can be selected as desired.

The first planar lead wires 27 are congregated to the same side of the first transparent conductive layer 22 and electrically connected to the external circuit. The first planar lead wires 27 are spaced from each other and located on the insulated substrate 23. The first planar lead wires 27 are formed by printing silver paste at the edge of the insulated substrate 23. The first planar lead wires 27 extend crossing over the folded part 234 to converge at the same side of the insulated substrate 23 substantially parallel to the Y direction. As such, parts of the first planar lead wires 27 substantially parallel to the X direction are located on the folded part 234, and the other parts of the first planar lead wires 27 substantially parallel to the Y direction are located on the planar part 232.

The second planar lead wires 29 are converged at the same side of the second transparent conductive layer 24 and electrically connected to the external circuit connected with the first planar lead wires 27. The second planar lead wires 29 are spaced from each other. The method for making the second planar lead wires 29 is the same as that of the first planar lead wires 27.

The side electrodes 212 are located, spaced on the first side conductive part. The side electrodes 212, the first conductive part and the side lead wires 214 are formed into a side touch module 21. The side electrodes 212 correspond to a plurality of virtual keys in a one-by-one manner. The side touch module 21 is used to sense signals resulted from pressing the virtual keys. In one embodiment, locations of the side electrodes 212 are stacked with the positions of the virtual keys. The virtual keys are used to control volume. The side touch module 21 detects the touch points according to the changes of the capacitances in the first side conductive part. The side lead wires 214 are spaced from each other. Each side lead wire 214 is partly located on the folded part 234, and partly located on the planar part 232. The side lead wires 214 and the first planar lead wires 27 are converged at the same side of the insulated substrate 23, to electrically connected to the external circuit. The side electrodes 212 and the side lead wires 214 are formed by printing silver paste on the insulated substrate 23.

The insulated substrate 23 separates the first transparent conductive layer 22 and the second transparent conductive layer 24. The first conductive strips of the first transparent conductive layer 22 are intercrossed with the second conductive strips of the second transparent conductive layer 24 to form a plurality of intercrossed positions. A capacitance can be formed between each of the plurality of intercrossed positions. The capacitance connects with an external electrical circuit by one of the first planar electrodes 26 and one of the second planar electrodes 28. When a finger or other touch tools touch a point close to one or more of the intercrossed positions, the capacitance formed between the one or more of the intercrossed positions will change. The external electrical circuit can detect the change of the capacitance. Therefore, the point of the planar touch module 25 can be detected. When the finger or other touch tools touch a point close to one of the side electrodes 212 of the side touch module 21, the capacitance formed by the side electrode 212 will change. There is no need additional circuit to detect the touch point of the side touch module 21. Therefore, the touch panel 20 can sense signals resulted from two different surfaces.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not restricted to the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A touch panel, comprising:
   an insulated substrate comprising a planar part and a folded part extending from the planar part;
   a transparent conductive layer located on the planar part and the folded part;
   a plurality of planar electrodes located on the planar part and electrically connected to the transparent conductive layer, to form a planar touch module comprising the plurality of planar electrodes, the transparent conductive layer and the planar part, the planar touch module configured to detect a planar input signal resulted from the planar part; and
   at least one side electrode located on the folded part, and electrically connected to the transparent conductive layer on the folded part, to form a side touch module comprising the folded part, the at least one side electrode and the transparent conductive layer on the folded part, wherein the at least one side electrode corresponds to at least one virtual key, the side touch module is configured to sense a side input signal resulted from the at least one virtual key.

2. The touch panel of claim 1, wherein the at least one side electrode comprises a plurality of side electrodes located apart from each other, and the plurality of side electrodes correspond to a plurality of virtual keys.

3. The touch panel of claim 1, wherein the transparent conductive layer comprises a plurality of carbon nanotubes substantially oriented along a same direction.

4. The touch panel of claim 3, wherein the plurality of carbon nanotubes are joined end-to-end by van der Waals force along the same direction.

5. The touch panel of claim 3, wherein a folded line is located between the planar part and the folded part, the plurality of planar electrodes are located beside the folded line.

6. The touch panel of claim 1, wherein the planar input signal is a single-touch input signal, a multi-touch input signal, or a hand figure input signal.

7. The touch panel of claim 1, wherein an angle defined by the folded part and the planar part is larger than or equal to −180 degrees, and less than or equal to 180 degrees, and exclusive of 0 degrees.

8. The touch panel of claim 1, wherein the plurality of planar electrodes are located on two opposite sides of the transparent conductive layer.

9. The touch panel of claim 1, wherein the plurality of planar electrodes are located on a same side of the transparent conductive layer.

10. The touch panel of claim 1, wherein the planar touch module further comprises a plurality of planar lead wires electrically connected to the plurality of planar electrodes in a one-by-one manner.

11. The touch panel of claim 10, wherein the side touch module further comprises at least one side lead wire electrically connected to the at least one side electrode in a one-by-one manner.

12. The touch panel of claim 11, wherein the at least one side lead wire and the plurality of planar lead wires are converged at the same side of the transparent conductive layer.

13. The touch panel of claim 1, wherein a material of the transparent conductive layer comprises carbon nanotubes or an electrical polymer.

14. A touch panel, comprising:
    an insulated substrate comprising a planar part and at least one folded part extending from the planar part;
    a first transparent conductive layer comprising a plurality of first carbon nanotubes substantially oriented along a first direction, and a second transparent conductive layer comprising a plurality of second carbon nanotubes substantially oriented along a second direction substantially perpendicular to the first direction, the first transparent conductive layer and the second transparent conductive layer located on two opposite surfaces of the insulated substrate, the first transparent conductive layer located on the planar part and the at least one folded part, the second transparent conductive layer located on the planar part;
    a plurality of first planar electrodes electrically connected to the first transparent conductive layer, a plurality of second planar electrodes electrically connected to the second transparent conductive layer, the plurality of first planar electrodes, the plurality of second planar electrodes, the first transparent conductive layer and the second transparent conductive layer being formed into a planar touch module capable of detecting a planar input signal resulted at the planar part; and
    at least one side electrode located on the at least one folded part and electrically connected to the first transparent conductive layer on the at least one folded part, to form at least one side touch module comprising the at least one folded part, the at least one side electrode and the first transparent conductive layer on the at least one folded part, wherein the at least one side electrode corresponds to at least one virtual key, the at least one side touch module is configured to sense a side input signal resulted from the at least one virtual key.

15. The touch panel of claim 14, wherein the planar part comprises two opposite edges, the at least one folded part comprises two opposite folded parts respectively extending from the two opposite edges.

16. The touch panel of claim 15, wherein the at least one side electrode comprises a plurality of side electrodes spaced from each other and corresponding to a plurality of virtual keys, and the plurality of side electrodes are located on the two opposite folded parts.

17. The touch panel of claim 14, wherein arrangement directions of the plurality of first planar electrodes and the plurality of second planar electrodes are substantially perpendicular to each other.

18. The touch panel of claim 14, wherein the planar touch module further comprises a plurality of first planar lead wires electrically connected to the plurality of first planar electrodes in a one-by-one manner, and a plurality of second planar lead wires electrically connected to the plurality of second planar electrodes in a one-by-one manner.

19. The touch panel of claim 18, wherein the at least one side touch module further comprises at least one side lead wire electrically connected to the at least one side electrode in a one-by-one manner.

20. The touch panel of claim 19, wherein the at least one side lead wire and the plurality of first planar lead wires and the plurality of second planar lead wires are converged at the same side of the insulated substrate.

\* \* \* \* \*